O. A. YOUNGREN.

LIFE PRESERVER.

APPLICATION FILED MAR. 6, 1916.

Reissued Apr. 11, 1916.

14,110.

Inventor:

Oscar A. Youngren, by Bedford & Sorlien,

Attorneys

NORRIS PETERS, INC., LITHO., WASHINGTON, D. C.

UNITED STATES PATENT OFFICE.

OSCAR A. YOUNGREN, OF SHERIDAN, WYOMING, ASSIGNOR TO NATIONAL LIFE PRESERVER COMPANY, OF SHERIDAN, WYOMING, A CORPORATION OF WYOMING.

LIFE-PRESERVER.

14,110. Specification of Reissued Letters Patent. Reissued Apr. 11, 1916.

Original No. 1,123,058, dated December 29, 1914, Serial No. 773,681. Application for reissue filed March 6, 1916. Serial No. 82,506.

*To all whom it may concern:*

Be it known that I, OSCAR A. YOUNGREN, a citizen of the United States, residing at Sheridan, Sheridan county, and State of Wyoming, have invented and discovered certain new and useful Improvements in Life-Preservers, of which the following is a specification.

The object of my said invention is to provide a life preserver in the form of a water-proof suit adapted to completely inclose the body of the wearer and to be put on over the clothing, and one which may be readily adapted to float the wearer regardless of weight, and provide means for sustenance during a considerable period, all as will be hereinafter more fully described and claimed.

Figure 1:
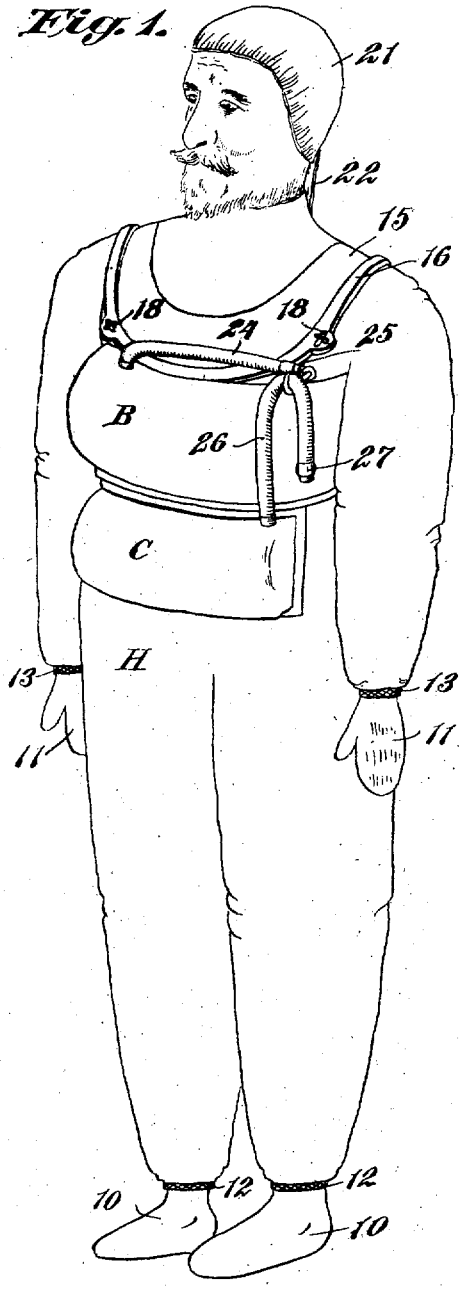
Figure 2:
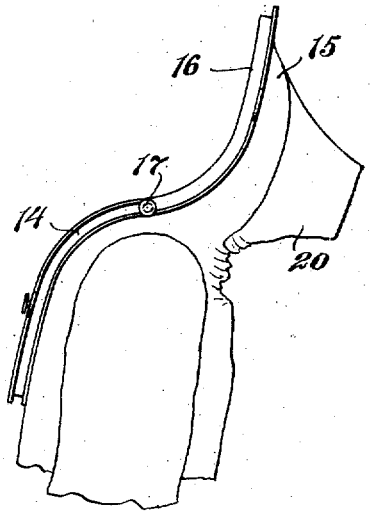
Figure 3:
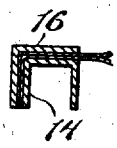

Referring to the accompanying drawings, which are made a part hereof, and on which similar reference characters indicate similar parts. Figure 1 is a view of a man having one of my improved life preservers adjusted as in position for use; Fig. 2 a detail view showing the upper portion of the suit in side elevation as when opened and ready to be put on; and Fig. 3 a detail section of the frame around the closure.

The general construction of the suit A is substantially as indicated in Fig. 1, being of one piece and made of water-proof material, such as rubber cloth and comprising legs, arms, and a body portion, the legs terminating in foot coverings 10 to receive the feet of the wearer, and the arms in hand coverings 11 to receive the hands of the wearer. Elastic bands 12 around the ankles serve to retain the foot coverings 10 upon the feet, and similar bands 13 retain the hand coverings 11 upon the hands. By this means the suit may be made of a size to be worn by a person of any size, and the foot and hand coverings can be held in place regardless of the length of the legs or arms of the wearer, adapting a single suit for use by persons of various sizes.

The only opening in the suit is near the upper end extending from approximately the top of the shoulders down and across the front in a curved direction. The body portion of the suit at this opening is attached to a metal frame 14 which is shaped substantially as shown in Fig. 2, to rest and fit comfortably upon the shoulders and chest of the wearer. The rear portion of the suit is in one piece, terminating in a yoke 15 which is attached to a metal frame portion 16, hinged at 17 to the other metal portion 14. Frame portion 16 to which the yoke 15 is attached is adapted to fit snugly over the portion 14 attached to the suit, and clamping screws 18, or other appropriate fastening devices, extend through ears on opposite sides and are adapted to clamp the parts together when closed as indicated in Fig. 1. A neck portion 20 of soft rubber, or other water-proof and elastic material, is attached to the yoke portion 15 and adapted to fit closely around the neck of the wearer. A hood portion 21 of water-proof material and having an elastic band around the edge of its opening is attached to the upper portion of the suit by a strap 22, thus providing for the protection of the hair and the head of the wearer from the water and the weather.

A collapsible air chamber B is provided which is adapted to extend around the body of the wearer adjacent to the arm pits, either formed in piece with said suit or formed separately and attached thereto, as may be desired. An inflating tube 24 with a mouth piece 25 containing a valve which will permit the air to be readily blown into the chamber, but prevent its escape, is attached to one side of said chamber in convenient position and of appropriate length to be reached and used by the wearer. A fresh water or other liquid containing chamber C is also attached to the front of the suit and is adapted to contain fresh water or other nourishing liquid and is provided with a tube 26, of convenient length to be used by the wearer, having a nozzle 27 containing a valve adapted to prevent ingress, but arranged to permit the contents to be drawn out by the person wearing the suit by suction.

The suit may be used as follows: Its upper end is opened as shown in Fig. 2. The person steps into the opening thus provided and draws the suit to position, then pulls the frame 16 with yoke 15 and elastic neck piece 20 over the head, all as shown in Fig. 1. The neck piece 20 will adjust itself snugly around the neck of the wearer and the frame piece 16 will fit tightly within the frame portion 14 on the upper end of the suit. The clamping screws 18 are then adjusted to clamp the two frame parts together, forming a water tight joint, and render the entire suit water-proof. The hand covering portions 11 and foot covering portions 10 are secured to the hands and feet respectively by the bands 12 and 13. The hood 21 is adjusted in position. The chamber B is inflated by blowing air through tube 24 until the proper degree of inflation has been secured to obtain the buoyancy desired. The wearer can then jump into the water with reasonable safety and will be sustained with head and shoulders floating above the water until rescued. Should the air chamber become deflated to any appreciable degree the wearer can readily supply the air, by blowing through tube 24, to maintain its buyancy as may be needed. The nourishment provided in chamber C may be partaken of through tube 26 as the wearer needs it, and life be thus prolonged for an extended period of time or until rescued.

As will be seen from the foregoing description and illustration, this suit can be readily and quickly put on by any person without stopping to remove clothing, whether man or woman, and will protect the clothing from water as well as protect the body of the wearer from the cold and exposure incident to a struggle for life in the water after shipwreck or other catastrophe.

It will be understood that various modifications in the details of form and arrangement of parts may be made without departing from the spirit of my invention or the scope thereof as defined by the claims hereto appended.

Having thus fully described my said invention, what I claim as new, and desire to secure by Letters Patent, is:

1. A life preserver comprising a one piece suit of water-proof material provided with a neck yoke and adapted to inclose the entire person from neck to feet and having but a single opening at the upper end thereof, said opening being provided with a closure comprising a two part frame, one part attached to the body of the suit and the other part to the yoke, and means for clamping said parts tightly together, substantially as set forth.

2. A life preserver comprising a one piece suit of water-proof material, having a single opening at the upper end thereof, a yoke formed in piece with the back of said suit and attached to close said opening at the front, an inherently elastic self-closing neck piece attached to said yoke, and an air chamber extending around the body of the suit, substantially as set forth.

3. A life preserver comprising a one piece suit of water-proof material with an opening at its upper end, a yoke connected with one side of said suit permanently and detachably connected to the other side of said suit whereby said opening may be tightly closed, an elastic self-closing neck piece carried by said yoke, an air chamber adapted to surround the body of the wearer, a liquid chamber also attached to said suit, means for supplying air to said air chamber, and means for withdrawing the contents from the liquid chamber, substantially as set forth.

4. A life preserver comprising a one piece suit of water-proof material having a single opening near the upper end thereof, a yoke formed in piece with the back of said suit and attached to close said opening at the front, an inherently elastic self-closing neck piece attached to said yoke, and means for imparting buoyancy to the suit, substantially as set forth.

5. A life preserver comprising a one piece suit of water-proof material having an opening near the upper end thereof of a size adapted to receive the body of the wearer, a yoke formed in piece with one side of said suit and attached to close said opening, an inherently elastic self-closing neck piece attached to said yoke, and buoyancy imparting means attached to said suit, substantially as set forth.

6. A life preserver comprising a water-proof body-inclosing suit formed with two distinct and spaced openings, one near the upper end thereof of a size adapted to admit the person and the other at the extreme upper end thereof adapted to pass over the head of the person, the first mentioned opening being provided with closure securing means adapted to form a water-tight joint and the second named opening being formed of inherently elastic material whereby it becomes self-closing around the neck of the wearer, substantially as set forth.

7. A life preserver comprising a water-proof body-inclosing suit formed with an opening near its upper end to admit the person of the wearer, means attached around said opening to close the same with a water-tight joint, one side of said closure means comprising a single integral member adapted to pass over the head of the wearer and impinge against the other side, and a neck piece formed to receive the head of the wearer, substantially as set forth.

In witness whereof, I have hereunto set my hand and seal at Washington, District of Columbia, this 7th day of February, A. D. nineteen hundred and sixteen.

OSCAR A. YOUNGREN.

Witnesses:
E. W. Bradford,
E. G. Clements.